United States Patent
Vitthaladevuni et al.

(10) Patent No.: US 8,537,879 B2
(45) Date of Patent: Sep. 17, 2013

(54) MIMO DESIGN WITH CODEBOOK RESTRICTIONS

(75) Inventors: Pavan Kumar Vitthaladevuni, San Diego, CA (US); Haitong Sun, San Diego, CA (US); Danlu Zhang, San Diego, CA (US); Jilei Hou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 579 days.

(21) Appl. No.: 12/777,787

(22) Filed: May 11, 2010

(65) Prior Publication Data

US 2011/0116563 A1     May 19, 2011

Related U.S. Application Data

(60) Provisional application No. 61/261,587, filed on Nov. 16, 2009.

(51) Int. Cl.
     *H04B 1/69*          (2011.01)
     *H04B 7/02*          (2006.01)

(52) U.S. Cl.
     USPC ................. 375/146; 375/267; 455/69

(58) Field of Classification Search
     USPC .............. 375/133, 135, 141, 146, 260, 267, 375/299; 370/208, 319–321, 355, 337, 342, 370/344, 347; 455/24, 69
     See application file for complete search history.

(56) References Cited

U.S. PATENT DOCUMENTS

| | | | |
|---|---|---|---|
| 2008/0225960 A1* | 9/2008 | Kotecha et al. | 375/259 |
| 2009/0215480 A1* | 8/2009 | Kim et al. | 455/501 |
| 2009/0323849 A1* | 12/2009 | Bala et al. | 375/267 |
| 2010/0035627 A1* | 2/2010 | Hou et al. | 455/452.2 |
| 2010/0118997 A1* | 5/2010 | Lee et al. | 375/260 |

FOREIGN PATENT DOCUMENTS

WO    WO2006055718     5/2006

OTHER PUBLICATIONS

Ericsson et al: "HSDPA MIMO codebook subset restriction", 3GPP Draft; R1-095061 HSDPA MIMO Codebook Subset Restriction, 3RD Generation Partnership Project (3GPP), Mobile Competence Centre ; 650, Route Des Lucioles ; F-06921 Sophia-Antipolis Cedex ; France, no. Jeju; 20091109, Nov. 9, 2009, XP050389400.
Huawei: "PMI/CQI/RI feedback for dual layer beamforming", 3GPP Draft; R1-093832, 3RD Generation Partnership Project (3GPP), Mobile Competence Centre ; 650, Route Des Lucioles ; F-06921 Sophia-Antipolis Cedex ; France, no. Miyazaki; 20091012, Oct. 12, 2009, XP050388340.

(Continued)

*Primary Examiner* — Young T. Tse
(74) *Attorney, Agent, or Firm* — Darren M. Simon

(57) ABSTRACT

A method of wireless communication includes utilizing a first outer loop for single-stream transmissions when a requested PCI by a UE is within a first set. The utilizing the first outer loop includes utilizing a first outer loop margin to adjust a size of a transport block by a first backoff margin when the UE requests a PCI within the first set. The method further includes utilizing a second outer loop for single-stream transmissions when the requested PCI by the UE is within a second set different from the first set. The utilizing the second outer loop includes utilizing a second outer loop margin to adjust the size of the transport block by a second backoff margin when the UE requests a PCI within the second set.

25 Claims, 19 Drawing Sheets

(56) References Cited

OTHER PUBLICATIONS

International Search Report and Written Opinion—PCT/US2010/056589—ISA/EPO—Jun. 20, 2011.
Nokia Siemens Networks et al: "HSDPA MIMO codebook restriction", 3GPP Draft; R1-095109 25214CR0592R1, 3RD Generation Partnership Project (3GPP), Mobile Competence Centre ; 650, Route Des Lucioles ; F-06921 Sophia-Antipolis Cedex ; France, no. Jeju; 20091109, Nov. 9, 2009, XP050390994.
Qualcomm Europe: "MIMO Codebook restrictions for single stream transmissions", 3GPP Draft, R1-095068 Mimo Codebook Restrictions, 3RD Generation Partnership Project (3GPP), Mobile Competence Centre, 650, Route Des Lucioles, F-06921 Sophia-Antipolis Cedex, France, no. Jeju, 20091109, Nov. 9, 2009, XP050389407, [retrieved on Nov. 13, 2009].

\* cited by examiner

MIMO DESIGN WITH CODEBOOK RESTRICTIONS

CROSS-REFERENCE TO RELATED APPLICATIONS

Pursuant to 35 U.S.C. §119(e), this application claims the benefit of U.S. Provisional Patent Application No. 61/261,587, entitled "MIMO Design with Codebook Restrictions," filed on Nov. 16, 2009, which is expressly incorporated by reference herein in its entirety.

BACKGROUND

1. Field

The present disclosure relates generally to communication systems, and more particularly, to signaling of multiple-input multiple-output (MIMO) codebook restriction to user equipment (UE).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is high-speed downlink packet access (HSDPA). HSDPA allows networks based on the Universal Mobile Telecommunications System (UMTS) to have higher data transfer speeds and capacity.

SUMMARY

In an aspect of the disclosure, a method, an apparatus, and a computer program product are provided in which a first outer loop is utilized for single-stream transmissions when a requested precoding information (PCI) by a UE is within a first set. In utilizing the first outer loop, a first outer loop margin is utilized to adjust a size of a transport block by a first backoff margin when the UE requests a PCI within the first set. In addition, a second outer loop is utilized for single-stream transmissions when the requested PCI by the UE is within a second set different from the first set. In utilizing the second outer loop, a second outer loop margin is utilized to adjust the size of the transport block by a second backoff margin when the UE requests a PCI within the second set.

In an aspect of the disclosure, a method, an apparatus, and a computer program product are provided in which a first channel is configured from a first antenna, a second channel is configured from a second antenna, and a codebook restriction is signaled to a MIMO capable UE. The codebook restriction includes information for indicating PCI that should not be requested by the UE for a single-stream transmission.

In an aspect of the disclosure, a method, an apparatus, and a computer program product are provided in which a codebook restriction is received. The codebook restriction includes information for indicating a plurality of PCIs in a prohibited set that should not be requested. In addition, the PCIs in the prohibited set are eliminated from being selected from a set of PCIs. Furthermore, a request is sent for one of remaining PCIs in the set of PCIs. The remaining PCIs are in a restricted set.

DETAILED DESCRIPTION

Figure 1:
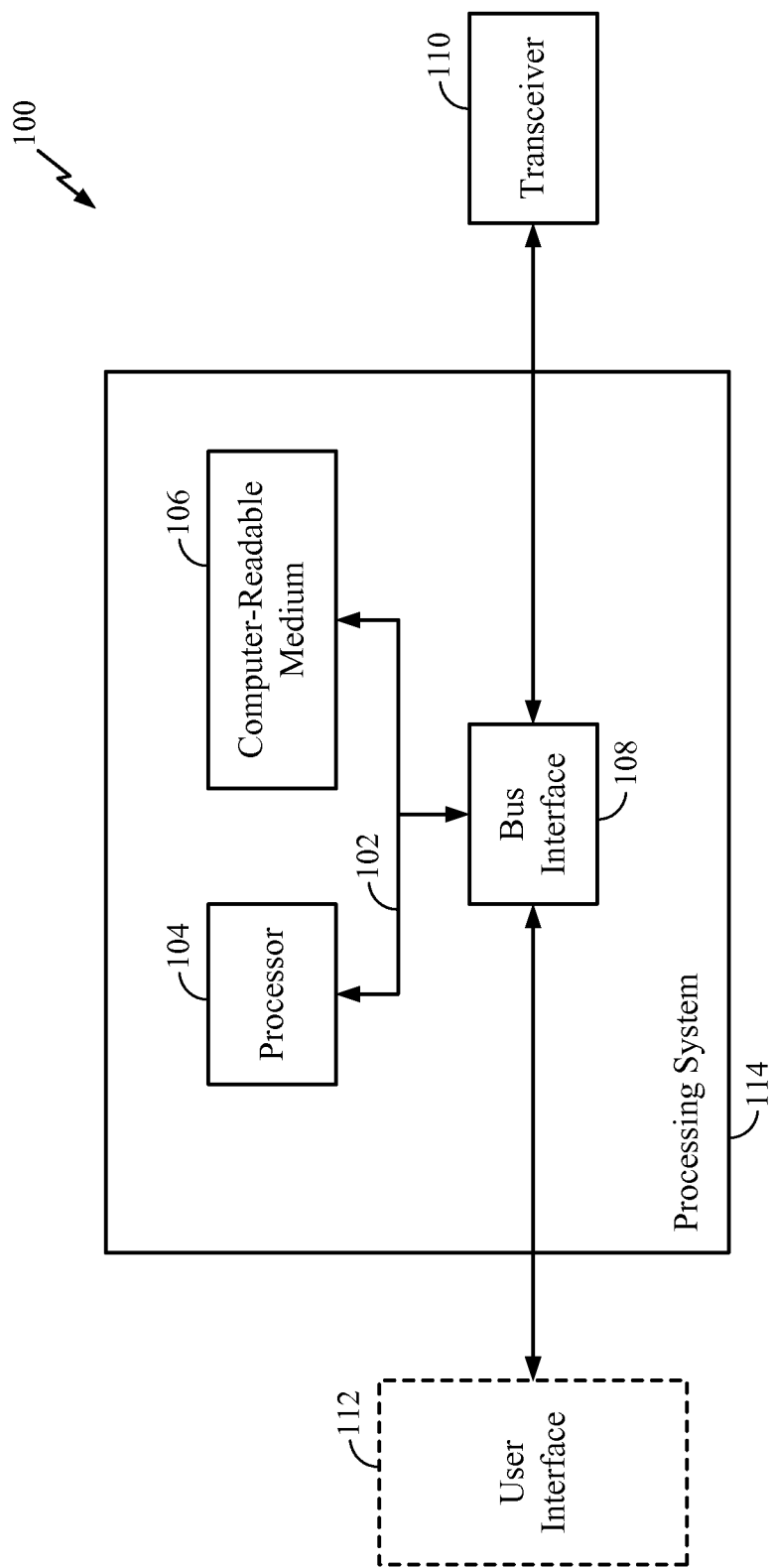
FIG. 1 is a conceptual diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
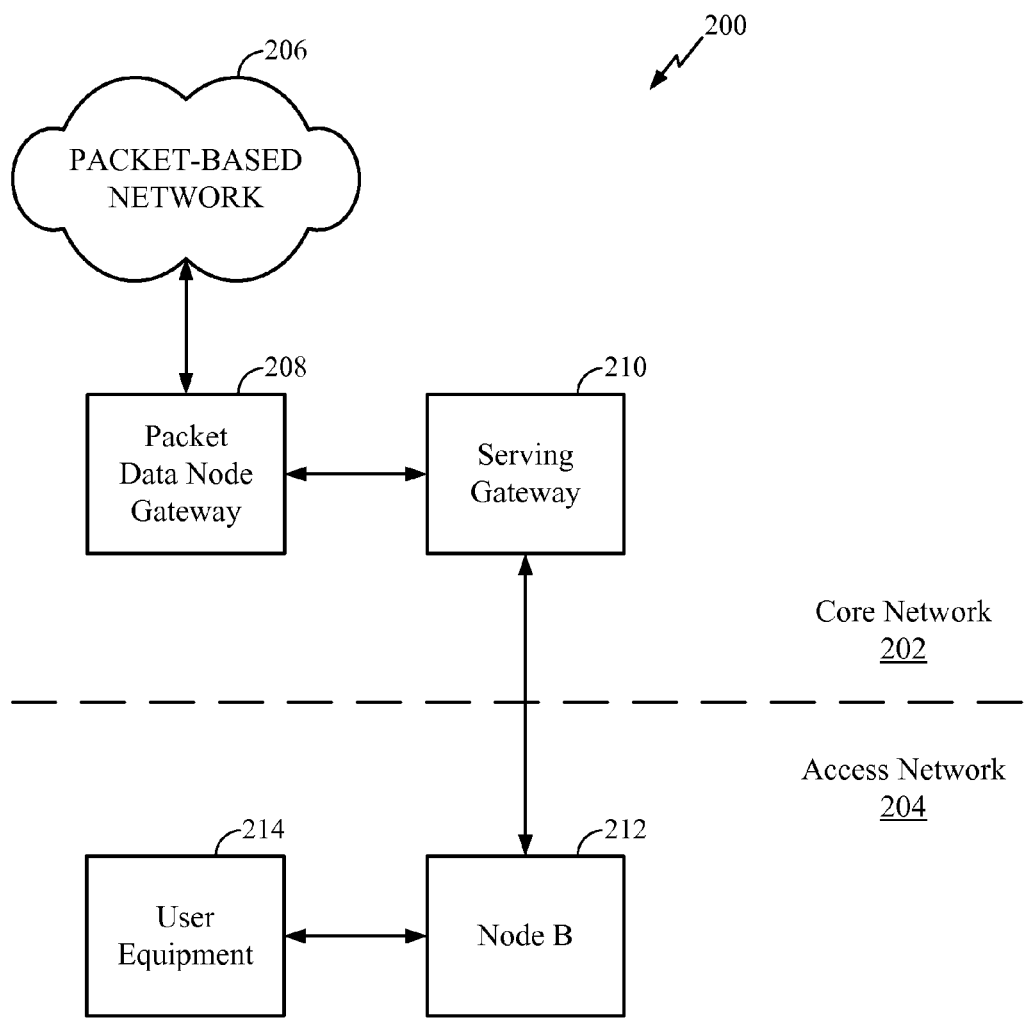
FIG. 2 is a conceptual diagram illustrating an example of a network architecture.

An example of a telecommunications system employing various apparatus will now be presented with reference to an HSDPA network architecture as shown in FIG. 2. The HSDPA network architecture 200 is shown with a core network 202 and an access network 204. In this example, the core network 202 provides packet-switched services to the access network 204, however, as those skilled in the art will readily appreciate, the various concepts presented throughout this disclosure may be extended to core networks providing circuit-switched services.

The access network 204 is shown with a single apparatus 212, which is commonly referred to as a Node B in HSDPA applications, but may also be referred to by those skilled in the art as a base station, a base transceiver station, a radio base station, a radio transceiver, a transceiver function, a basic service set (BSS), an extended service set (ESS), or some other suitable terminology. The Node B 212 provides an access point to the core network 202 for a mobile apparatus 214. Examples of a mobile apparatus include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The mobile apparatus 214 is commonly referred to as user equipment (UE) in HSDPA applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The core network 202 is shown with several apparatus including a packet data node (PDN) gateway 208 and a serving gateway 210. The PDN gateway 210 provides a connection for the access network 204 to a packet-based network 206. In this example, the packet-based network 206 is the Internet, but the concepts presented throughout this disclosure are not limited to Internet applications. The primary function of the PDN gateway 208 is to provide the UE 214 with network connectivity. Data packets are transferred between the PDN gateway 208 and the UE 214 through the serving gateway 210, which serves as the local mobility anchor as the UE 214 roams through the access network 204.

Figure 3:
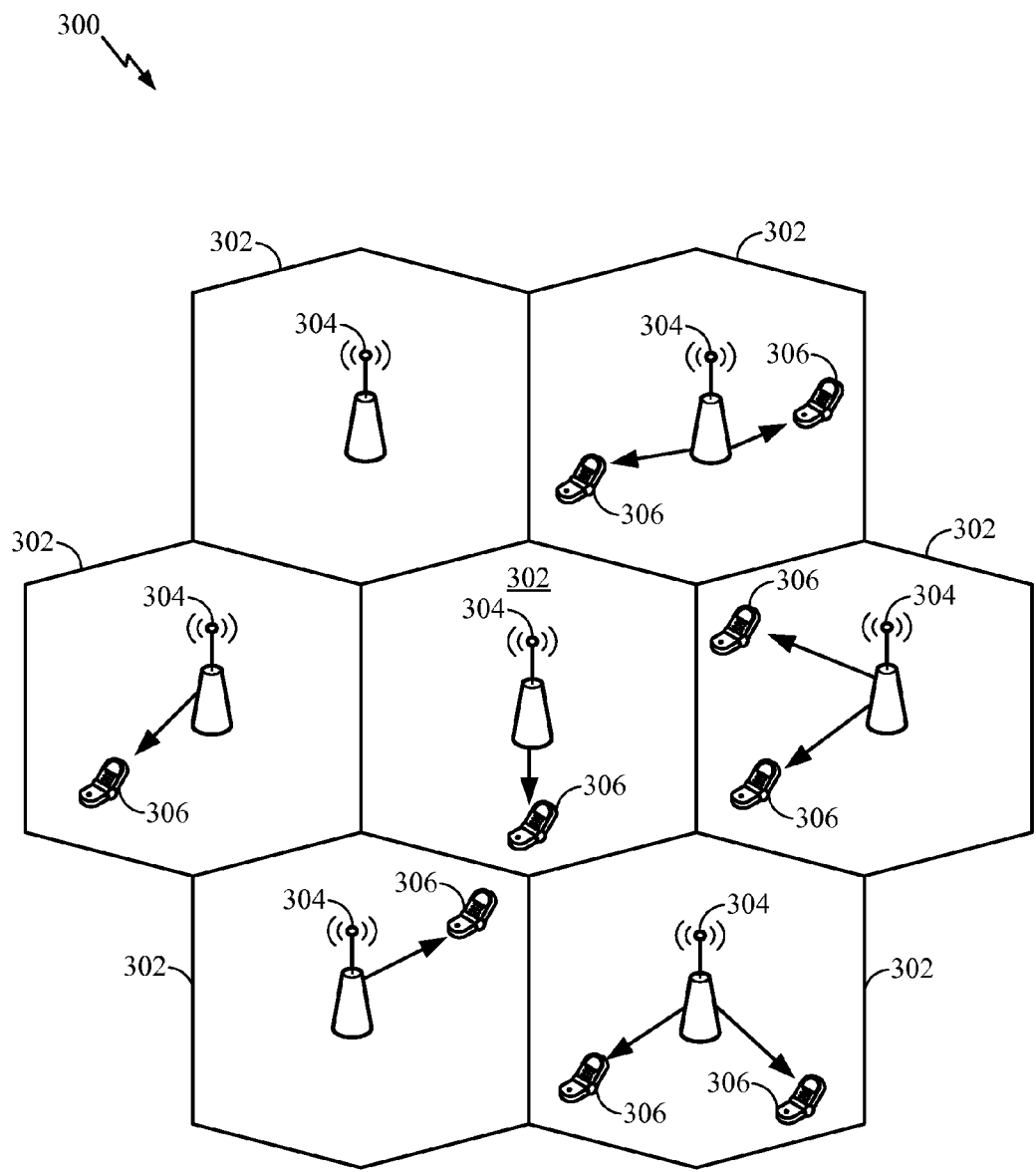
FIG. 3 is a conceptual diagram illustrating an example of an access network.

An example of an access network in an HSDPA network architecture will now be presented with reference to FIG. 3. In this example, the access network 300 is divided into a number of cellular regions (cells) 302. A Node B 304 is assigned to a cell 302 and is configured to provide an access point to a core network 202 (see FIG. 2) for all the UEs 306 in the cell 302. There is no centralized controller in this example of an access network 300, but a centralized controller may be used in alternative configurations. The Node B 304 is responsible for all radio related functions including radio bearer control, admission control, mobility control, scheduling, security, and connectivity to the serving gateway 210 in the core network 202 (see FIG. 2).

As those skilled in the art will readily appreciate from the detailed description to follow, the various concepts presented herein are well suited for HSDPA applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The Node B 304 may have multiple antennas supporting MIMO technology. The use of MIMO technology enables the Node B 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more the data streams destined for that UE 306. On the uplink, each UE 306 transmits a spatially precoded data stream, which enables the Node B 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Figure 4:
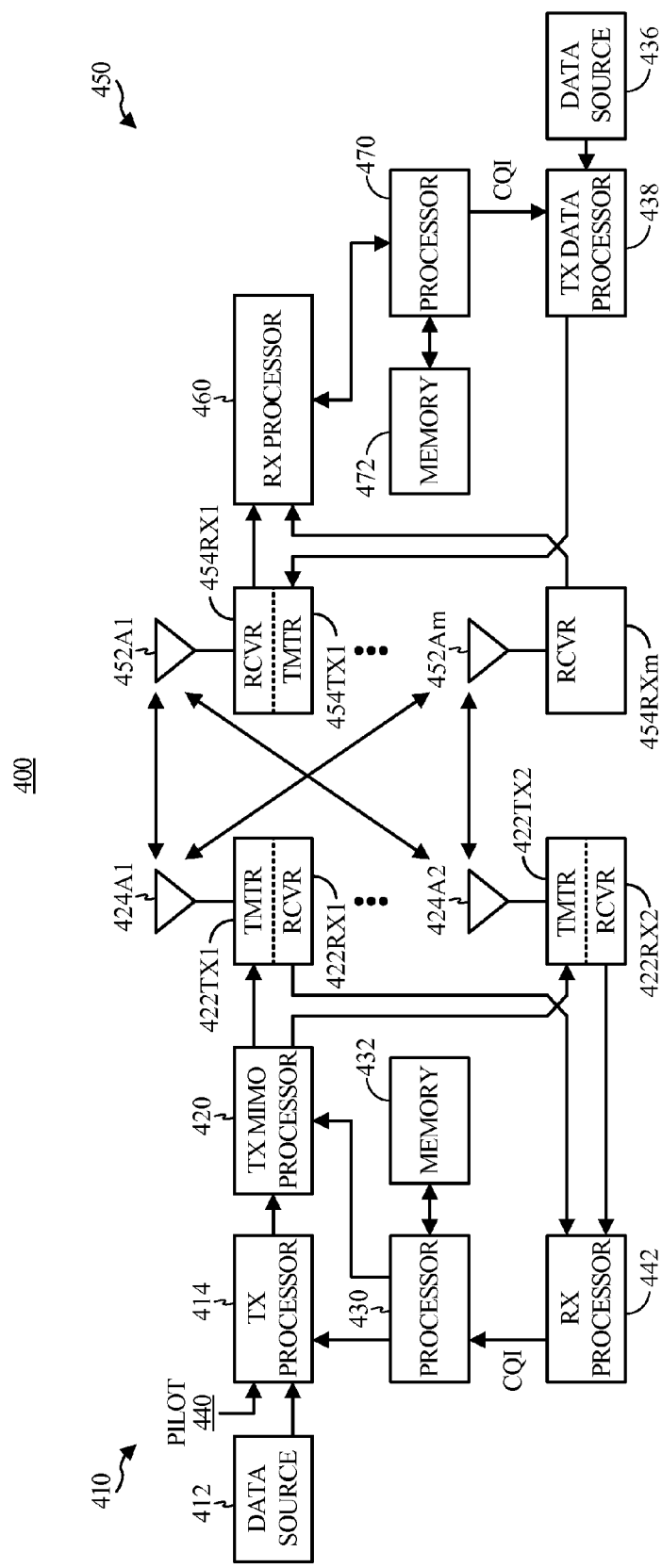
FIG. 4 is a conceptual diagram illustrating an example of a Node B and UE in an access network.

FIG. 4 is a block diagram of a wireless communication system 400. The wireless communication system 400 depicts block diagrams for a Node B 410 in communication with a UE 450. At Node B 410, traffic data for a number of data streams is provided from a data source 412 to a transmit (TX) processor 414. The TX processor 414 formats, codes, and interleaves the traffic data stream based on a particular coding scheme selected for that data stream to provide coded data.

The TX processor 414 combines the coded data for each data stream with pilot data 440. The pilot data 440 is typically a known data pattern that is processed in a known manner and can be used at the UE 450 to estimate the channel response. The TX processor 414 can modulate the coded data for each data stream based on a particular modulation scheme (e.g., binary phase-shift keying (BPSK), quadrature phase-shift keying (QPSK), M-phase-shift keying (M-PSK), M-quadrature amplitude modulation (M-QAM)) selected for that data stream to provide modulation symbols. The data rate, coding, and modulation for each data stream can be determined by instructions performed or provided by the processor 430.

In a Node B 410 supporting MIMO communications, the modulation symbols for the data streams can be provided to a TX MIMO processor 420. The TX MIMO processor 420 then provides one or two modulation symbol streams (or spatial streams) to two transmitters (TMTR) 422TX1 and 422TX2.

Each transmitter 422TX receives and processes a respective symbol stream to provide one or more analog signals, and further conditions (e.g., amplifies, filters, and upconverts) the analog signals to provide a modulated signal suitable for transmission over the MIMO channel. Further, one or two modulated streams from the transmitters 422TX are transmitted from two antennas 424A1 and 424A2, respectively.

At the UE 450, the transmitted modulated signals are received by the m antennas 452A1 through 452Am and the received signal from each antenna 452 is provided to a respective receiver (RCVR) 454RX1 through 454RXm. Each receiver 454RX conditions (e.g., filters, amplifies, and downconverts) a respective signal, digitizes the conditioned signal to provide samples, and further processes the samples to provide received symbol streams.

An RX processor 460 can receive and process the received symbol streams from m receivers 454 based on a particular receiver processing technique to provide the "detected" symbol streams. RX processor 460 can demodulate, deinterleave, and decode each detected symbol stream to recover the traffic data for the data stream. The processing by RX processor 460 is complementary to that performed by TX MIMO processor 420 and TX processor 414 at the Node B 410.

The processor 470 can formulate an uplink message. The uplink message can include various types of information regarding the communication link and/or the received data stream. The uplink message is processed and modulated by a TX processor 438, which also receives traffic data from a data source 436, is conditioned by transmitters 454TX, and is transmitted back to the Node B 410.

The channel response estimate generated by the RX processor 460 can be used to perform space/time processing at the receiver, change modulation rates or schemes, or other actions. The RX processor 460 can further estimate the signal-to-noise-and-interference ratios (SNRs) of the detected symbol streams, and possibly other channel characteristics, and provides these quantities to the processor 470. The RX processor 460 or the processor 470 can further derive an estimate of the "operating" SNR for the system. The processor 470 then provides channel quality indicators (CQIs) and the precoding information (PCI), which is processed by the TX processor 438, and is further conditioned by the transmitter 454TX1, and transmitted back to the Node B 410.

At the Node B 410, the modulated signals from the UE 450 are received by the antennas 424, conditioned by the receivers 422RX, and demodulated and processed by a RX data processor 442 to extract the uplink message transmitted by the UE 450.

The processors 430 and 470 can direct (e.g., control, coordinate, manage) operation at the Node B 410 and the UE 450, respectively. The respective processors 430 and 470 can be associated with a memory 432 and 472 that store program codes and data. The processors 430 and 470 can also perform computations to derive channel estimates for the uplink and the downlink, respectively.

For MIMO deployment in HSDPA, either the diversity primary common pilot channel (P-CPICH) or the secondary common pilot channel (S-CPICH) can be configured from the second transmit antenna. When diversity P-CPICH is configured, power-balancing of the two power amplifiers (PAs) is achieved through the use of space time transmit diversity (STTD) on overhead channels. Given the loss in performance that accompanies STTD reception at the UE, configuring S-CPICH from the second transmit antenna is seen as a better option.

When S-CPICH is configured from the second transmit antenna, the two PAs are no longer power-balanced, as all overhead channels will be transmitted from the first transmit antenna, along with the P-CPICH. In order to power-balance the PAs, a work-around has been proposed as shown in FIG. 5.

Figure 5:
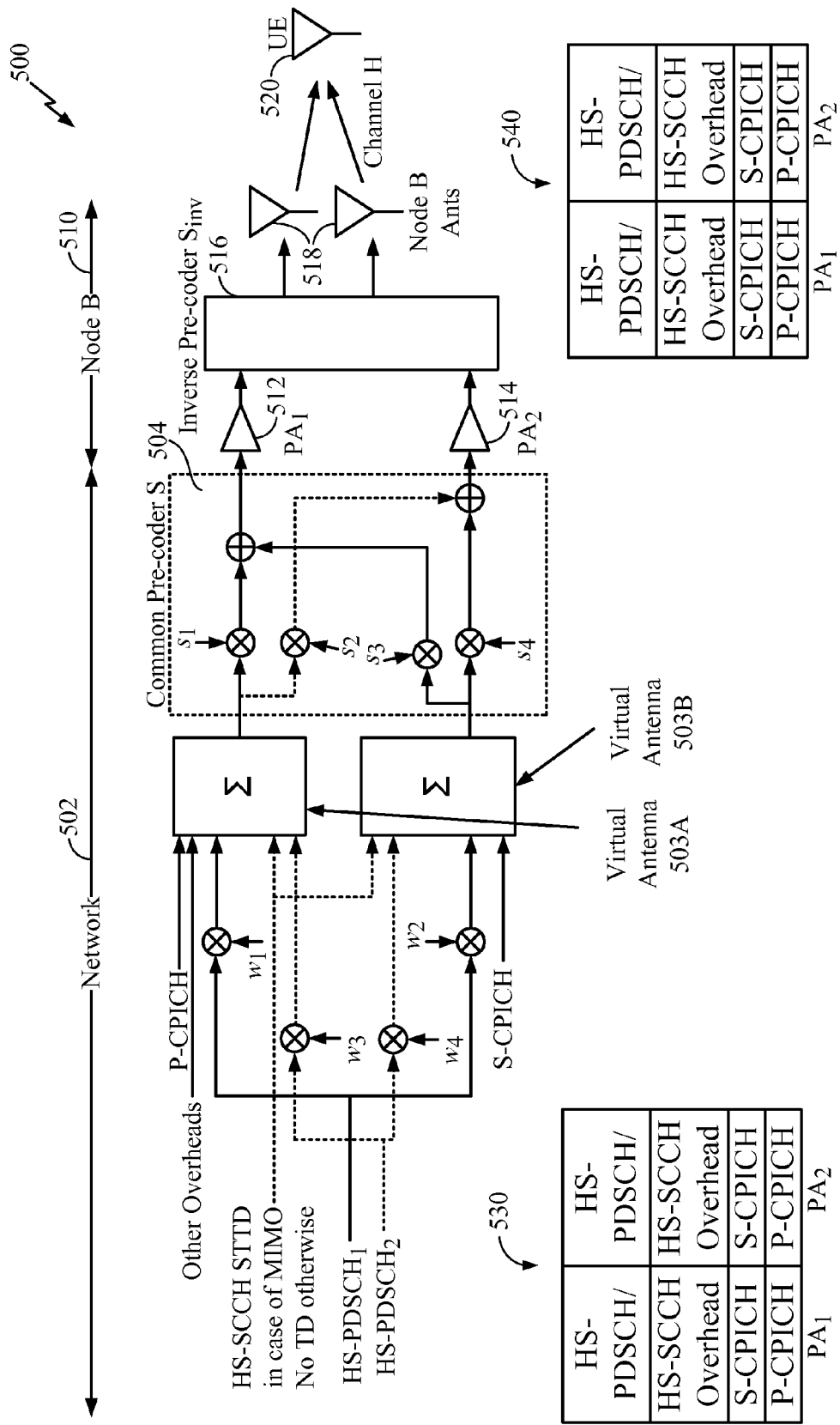
FIG. 5 is a block diagram showing a MIMO work-around using a precoding matrix.

FIG. 5 is a block diagram 500 showing a MIMO work-around 504 using a precoding matrix. As shown in FIG. 5, the P-CPICH is configured from the first virtual antenna 503A, the S-CPICH is configured from the second virtual antenna 503B, and the high speed physical downlink shared channel (HS-PDSCH) is configured from both the first virtual antenna 503A and the second virtual antenna 503B. The work-around 504 is applied by the network 502 and balances the two PAs 512, 514 at the Node B 510. The output of the two PAs 512, 514 may be input into an inverse precoding matrix 516, which would reverse the work-around 504 before the signal is transmitted to the UE 520. Reversing the work-around would reverse the effect of the pre-coding such that the legacy network coverage would be unchanged. As such, while the two PAs 512, 514 of the Node B 510 are balanced as shown in diagrams 530, 540, the antennas 518 of the Node B 510 are not necessarily balanced. The work-around 504 is a common precoder S located before the two PAs 512, 514, where S is given by:

$$S = \begin{bmatrix} s_1 & s_3 \\ s_2 & s_4 \end{bmatrix} = \frac{1}{\sqrt{2}} \begin{bmatrix} 1 & e^{j\pi/4} \\ 1 & -e^{j\pi/4} \end{bmatrix}.$$

The UE selects a $w_2$ from the following set of precoding vectors: $w_2 \in \{e^{j\pi/4}, e^{j3\pi/4}, e^{j5\pi/4}, e^{j7\pi/4}\}$, requests the Node B 510 to use the selected precoding vector, and sends channel quality indicator (CQI) feedback for the selected precoding vector.

However, the precoding matrix work-around requires a codebook restriction at the Node B 510 for a single-stream MIMO transmission from four to two precoding vectors. There is no such restriction for a dual stream MIMO transmission. That is, for a single-stream transmission, when the precoding matrix work-around is used, the Node B 510 may use only two of the four precoding vectors:

$w_2 \in \{e^{j\pi/4}, e^{j5\pi/4}\}$, for single-stream transmission (restricted/allowed set), $w_2 \notin \{e^{j3\pi/4}, e^{j7\pi/4}\}$, for single-stream transmission, (prohibited set).

Accordingly, when the Node B 510 receives a request for a precoding vector in the prohibited set, the Node B 510 must restrict to a precoding vector in the restricted/allowed set (herein referred to as "restricted set"). In such a situation, the CQI received for the precoding vector in the prohibited set is blindly applied to the precoding vector in the restricted set that is selected by the Node B 510, which ultimately causes some performance degradation.

The loss in two precoding vectors for a single-stream transmission leads to a loss in cell-edge throughput. However, if the UE 520 is not aware of the use of the common-precoder at the Node B 510, then the loss could potentially be much higher. Assume that a UE 520 sends a single-stream CQI corresponding to one of the two prohibited PCIs and the Node B 510 randomly re-quantizes these PCIs to the allowed ones (i.e., to a PCI in the restricted set). The CQI reported by the UE 520 is optimistic for this re-quantized PCI. The scheduler will have to depend on a slowly-varying outer-loop margin to correct for this error in CQI and the resultant performance for cell-edge UEs will suffer. In the case of multiple users per cell, this gives rise to a second-order effect. Proportional fair scheduler will increase the time-share of the cell-edge UEs and hurt the performance of high geometry UEs as well.

Figure 6:
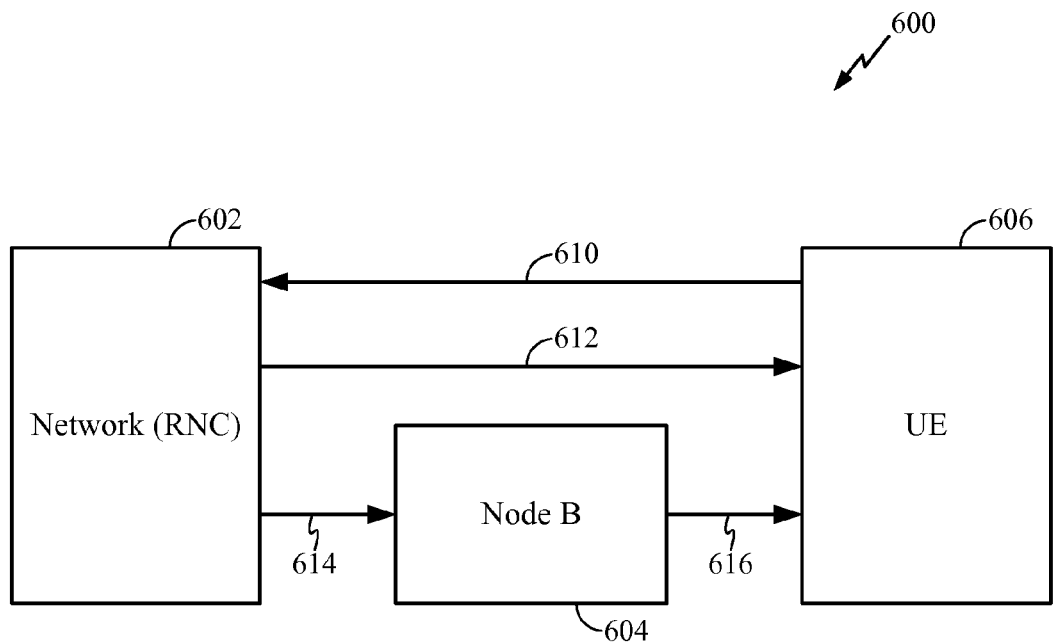
FIG. 6 is a block diagram illustrating a first exemplary configuration.

FIG. 6 is a block diagram 600 illustrating a first exemplary configuration. Given the work-around, one configuration for increasing the throughput is for the codebook restriction to be explicitly signaled 612 to the UE 606. In one configuration, the signaling 612 is by the network 602, such as by a radio network controller (RNC) through a radio resource control (RRC) message. In such a configuration, the UE 606 may announce 610 its capability of receiving a codebook restriction through an RRC message. In addition, in such a configuration, the RNC 602 notifies 614 the Node B 604 with which the UE 606 is communicating of the signaled codebook restriction and the UE 606 that received the codebook restriction. In another configuration, the signaling 616 is by the Node B 604 through a high-speed shared control channel (HS-SCCH) order. The HS-SCCH is a physical channel that may be utilized to carry downlink control information related to a transmission on the high speed downlink shared channel (HS-DSCH). The HS-DSCH is a transport channel that may be shared by several UEs. The HS-DSCH may be associated with one or more HS-SCCHs. The UE may continuously monitor the HS-SCCH to determine when to read its data from the HS-DSCH and to determine the modulation scheme used on the assigned physical channel.

Figure 7:
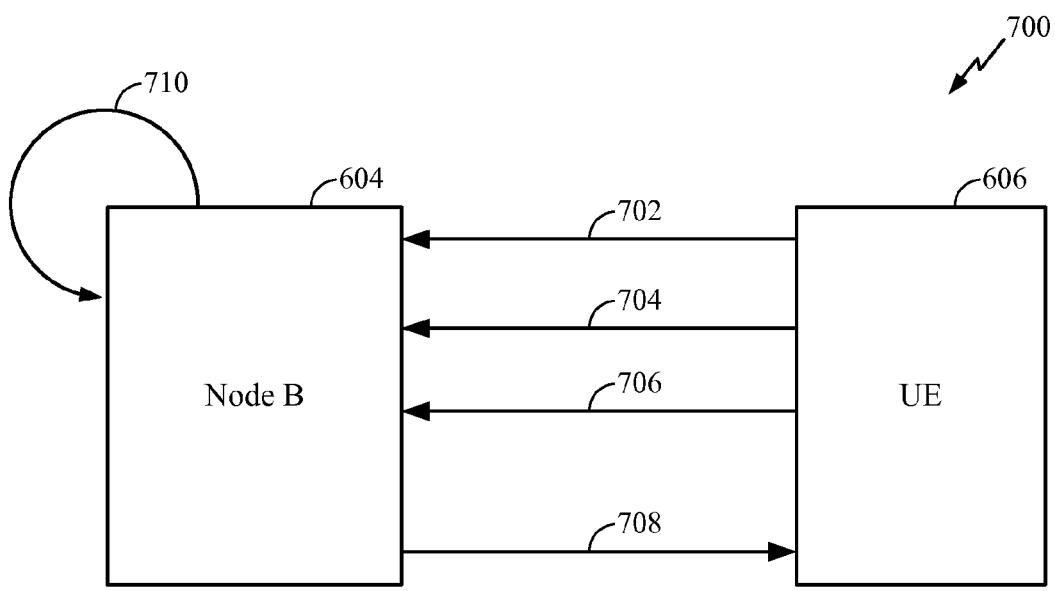
FIG. 7 is a block diagram illustrating a second exemplary configuration.

FIG. 7 is a block diagram 700 illustrating a second exemplary configuration. If explicitly signaling the codebook restriction as discussed in relation to FIG. 6 is not feasible, in a second configuration, the Node B 604 implements an outer-loop (OL) 710 that is based on or is a function of whether the precoding vector requested by the UE 606 is in the prohibited set or the restricted set. As shown in FIG. 7, the UE 606 sends information 702 to the Node B 604 indicating one of the four precoding vectors for $w_2$ and CQI 704 for that precoding vector. In addition, the UE 606 sends a hybrid automatic repeat request (HARQ) ACK/NAK 706 in response to a transmission 708 from the Node B 604. In the second configuration, the Node B 604 implements OL 710 that is based on or is a function of whether the UE-requested precoding vector received at 702 is in the prohibited set or the restricted set. An OL is a backoff of a transport block (TB) size in response to a reported CQI. The backoff may be applied by adjusting the CQI in dB by an OL margin $\delta$, and transmitting a reduced number of TBs corresponding to the adjusted CQI. Different $\delta$'s may be utilized, with $\delta$ being set to $\delta_R$ for dual-stream transmissions or single-stream transmissions when the UE's requested PCI is within the restricted set, and with $\delta$ being set to $\delta_P$ for single-stream transmissions when the UE's requested PCI is within the prohibited set. The OL margins $\delta_R$, $\delta_P$ may be adjusted when the Node B notices that the UE error rate is different than expected. In one configuration, the OL margins $\delta_R$, $\delta_P$ are adjusted upon receiving an HARQ-ACK/NAK, with an increase upon receiving an HARQ-NAK and a decrease upon receiving an HARQ-ACK. For example, if the Node B 604 expects that the UE will have an error rate of 10%, the Node B will expect a NAK for every 9 ACKs, and will decrease $\delta_R$ by $\delta_I$ upon receiving an HARQ-ACK and will increase $\delta_R$ by $9\delta_I$ upon receiving an HARQ-NAK for a transmission in response to a request for a precoding vector in the restricted set, and will decrease $\delta_P$ by $\delta_I$ upon receiving an HARQ-ACK and will increase $\delta_P$ by $9\delta_I$ upon receiving an HARQ-NAK for a transmission in response to a request for a precoding vector in the prohibited set. The OL margins $\delta_R$, $\delta_P$ could be negative.

The OL 710 may be a function of whether the UE-requested precoding vector is in the prohibited set or the restricted set. That is, the OL margin $\delta$ may be set equal to $\delta_R$ or $\delta_P$ depending on whether the precoding vector is in the restricted set or the prohibited set, respectively. The OL 710 may be considered two OLs, as the OL margin differs depending on whether the UE-requested precoding vector is in the prohibited set or the restricted set. The two OLs include a first OL for the OL margin $\delta_R$ and a second OL the OL margin $\delta_P$. That is, the first OL may be for dual stream transmission or single-stream transmission when the UE's requested PCI is within the restricted set. The second OL may be for single-stream transmissions when the UE's requested PCI is within the prohibited set. The UE may request a PCI in each transmission time interval (TTI), which is 2 ms. With two OLs, the OL margins applied when the UE's requested PCI is within the prohibited set are not applied when the UE's requested PCI is within the restricted set, thus resulting in a throughput improvement.

For example, if in a first TTI a UE requests a PCI in the prohibited set, the Node B will reduce a size of the TB by a prohibited backoff margin corresponding to an OL margin $\delta_P$ decrease to the reported CQI. If in a second TTI, the UE requests a PCI in the restricted set, the Node B will reduce a size of the TB by a restricted backoff margin corresponding to an OL margin $\delta_R$ decrease to the reported CQI. If in a third TTI, the UE requests a PCI in the prohibited set, the Node B will reduce the size of the TB by the prohibited backoff margin corresponding to an OL margin $\delta_P$ decrease to the reported CQI. By providing two OLs with independent control of the respective OL margins when the UE reports a PCI in the prohibited set and in the restricted set, throughput improvement may be realized. In one configuration, the OL margins $\delta_R$ and $\delta_P$ are static. When the OL margins are static, $\delta_R$ may be less than $\delta_P$, and therefore the reduction in size of the TB when the UE reports a PCI in the restricted set is less than when the UE reports a PCI in the prohibited set. In another configuration, as discussed supra, the OL margins $\delta_R$ and $\delta_P$ are dynamic. When the OL margins are dynamic, the OL margins may be reduced when HARQ-ACK messages are received and increased when HARQ-NAK messages are received. As such, in the example above, if the Node B receives an HARQ-NAK in response to the TB sent in response to the UE request in the first TTI, the Node B may increase the prohibited OL margin $\delta_P$ by a value $c\delta_I$, where c depends on an expected error rate of the UE, which when applied in the third TTI, will result in a further reduction in size of the TB in the third TTI.

With respect to a loss in UE throughputs when a MIMO codebook restriction is not signaled to the UE, when reported PCI is part of the prohibited set (−45 deg, +135 deg), the Node B re-quantizes the reported PCI into the restricted set (+45 deg, −135 deg). After re-quantization, the CQI used by the Node B will be optimistic. Transmissions based on this will see a higher block error rate (BLER), which will drive up the OL margins. Driving up the OL margins hurts cell-edge throughputs even in those TTIs when the CQI reported by the UE is in the restricted set. For multi-user transmissions, proportional fair (PF) scheduling spreads this loss to the good users by raising time-share of cell-edge users.

One way to reduce this effect is by the Node B 604 using an OL margin that is based on whether the UE's requested PCI is within the restricted set for dual-stream transmissions or single-stream transmissions or the UE's requested PCI is within the prohibited set for single-stream transmissions. As discussed supra, such an OL margin may be considered two OL margins, with a first OL margin for dual-stream transmissions and single-stream transmissions when the UE reports a PCI from the restricted set, and with a second OL margin for single-stream transmissions when the Node B re-quantizes the reported PCI into the restricted set. The OL margins may be static. Alternatively, the OL margins may be dynamic, with each of the OL margins being updated upon HARQ-ACK/NAK reception corresponding to its usage.

Figure 8:
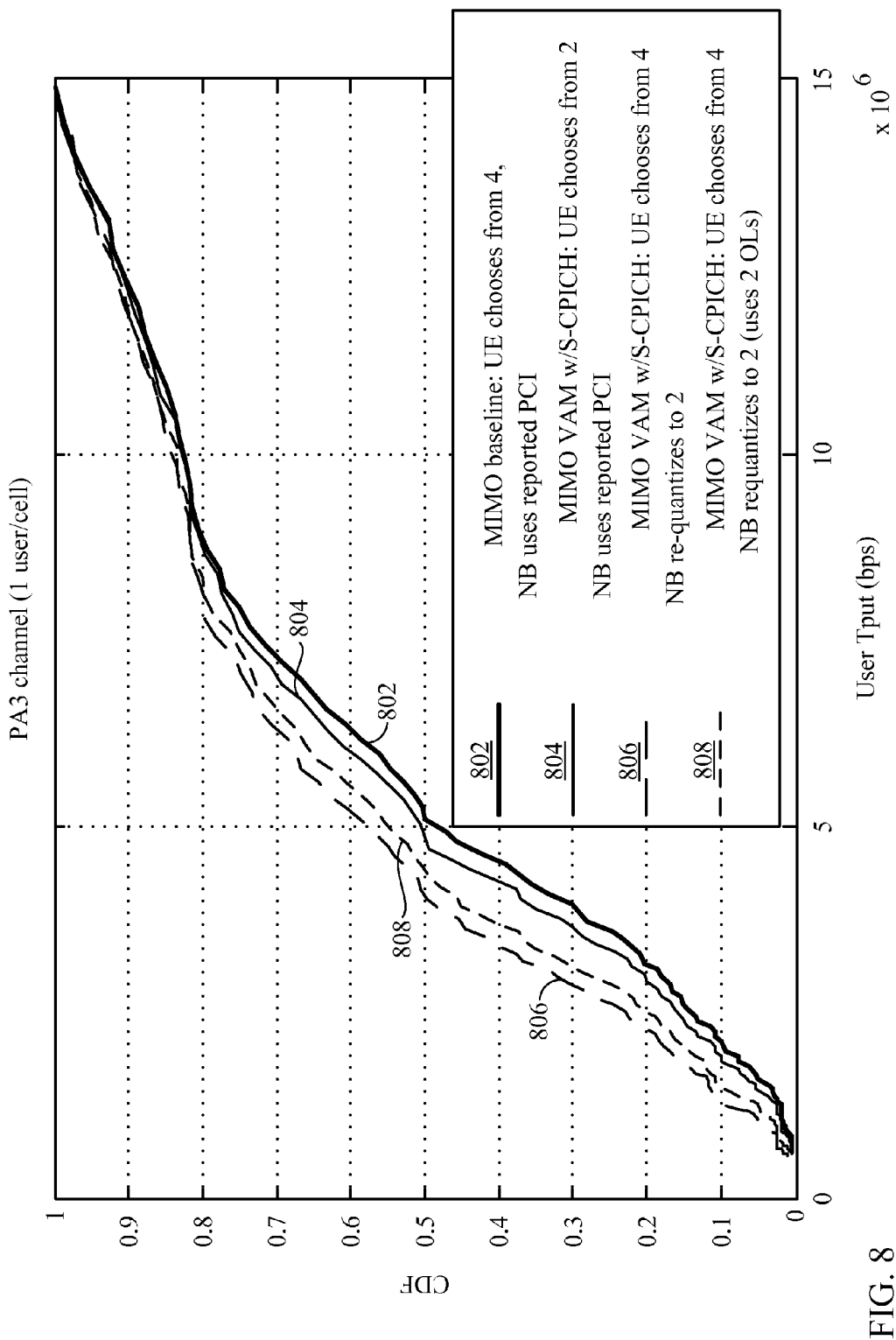
FIG. 8 is a graph of user throughput versus the cumulative density function (CDF) for one user per cell.

FIG. 8 is a graph of user throughput versus the cumulative density function (CDF) for one user per cell. As shown in FIG. 8, a MIMO baseline 802 shows the best possible throughput when the UE chooses from four PCIs and the Node B uses the reported PCI. However, as discussed supra, when S-CPICH is configured from the second transmit antenna, such a result is not possible, as the Node B cannot use the reported PCI if the PCI is in the prohibited set. If the codebook restrictions are explicitly signaled to the UE and the UE chooses from two PCIs and the Node B uses the reported PCI, the throughput will be as shown in line 804. If explicitly signaling codebook restrictions is not feasible, and the UE chooses from four PCIs and the Node B requantizes to two, the throughput will be as shown in line 806. By using the two OLs, as described supra, throughput can be improved to that shown in line 808.

Figure 9:
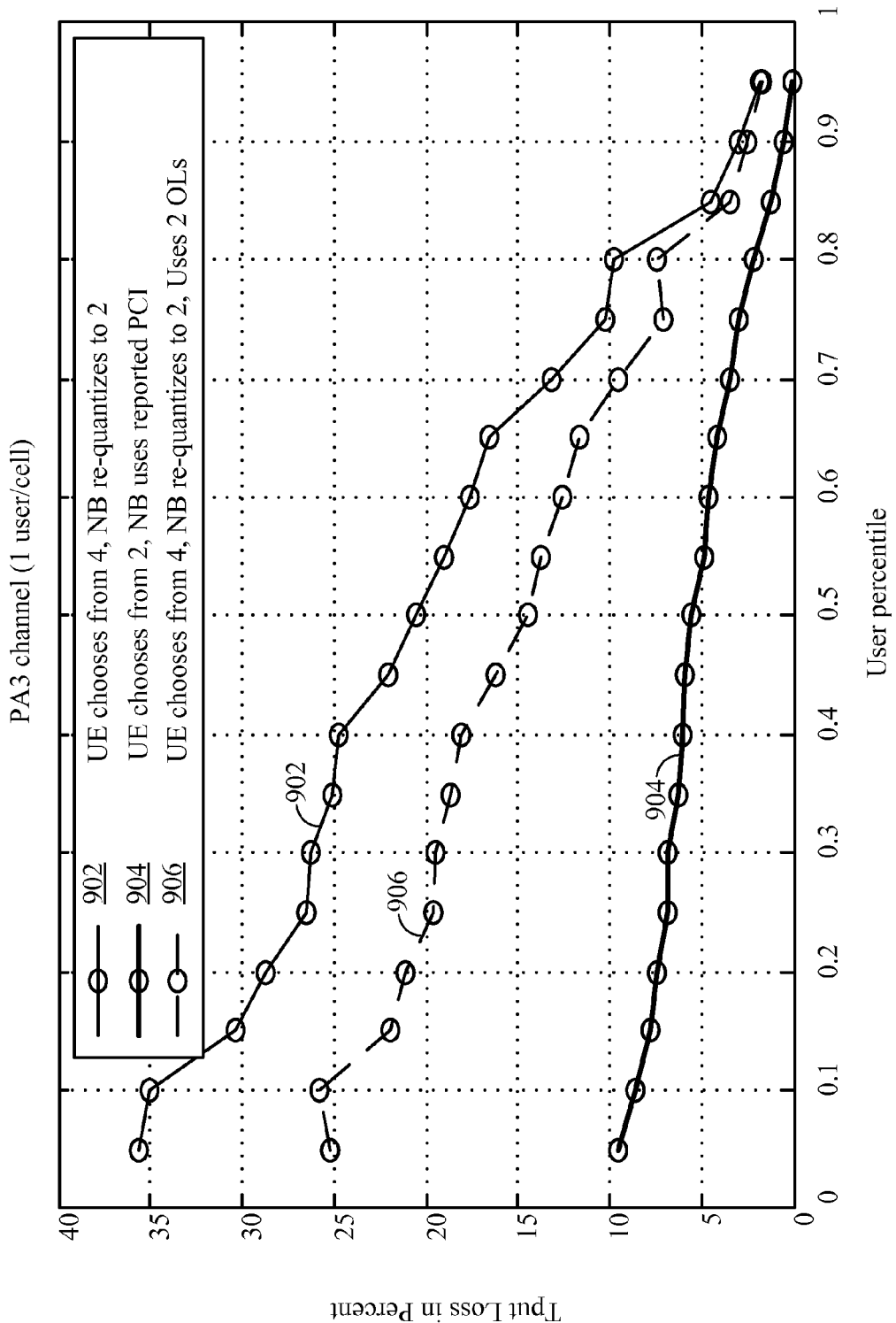
FIG. 9 is a graph of user percentile versus throughput loss in percent for one user per cell.

FIG. 9 is a graph of user percentile versus throughput loss in percent for one user per cell. Line 904 corresponds to line 804, when the codebook restriction is explicitly signaled to the UE. Line 902 corresponds to line 806, when the work-around is applied using one OL margin that does not vary depending on whether the reported PCI is in the restricted set or the prohibited set. Line 906 corresponds to line 808 and shows the throughput loss improvement when two OL margins are applied as described supra.

Figure 10:
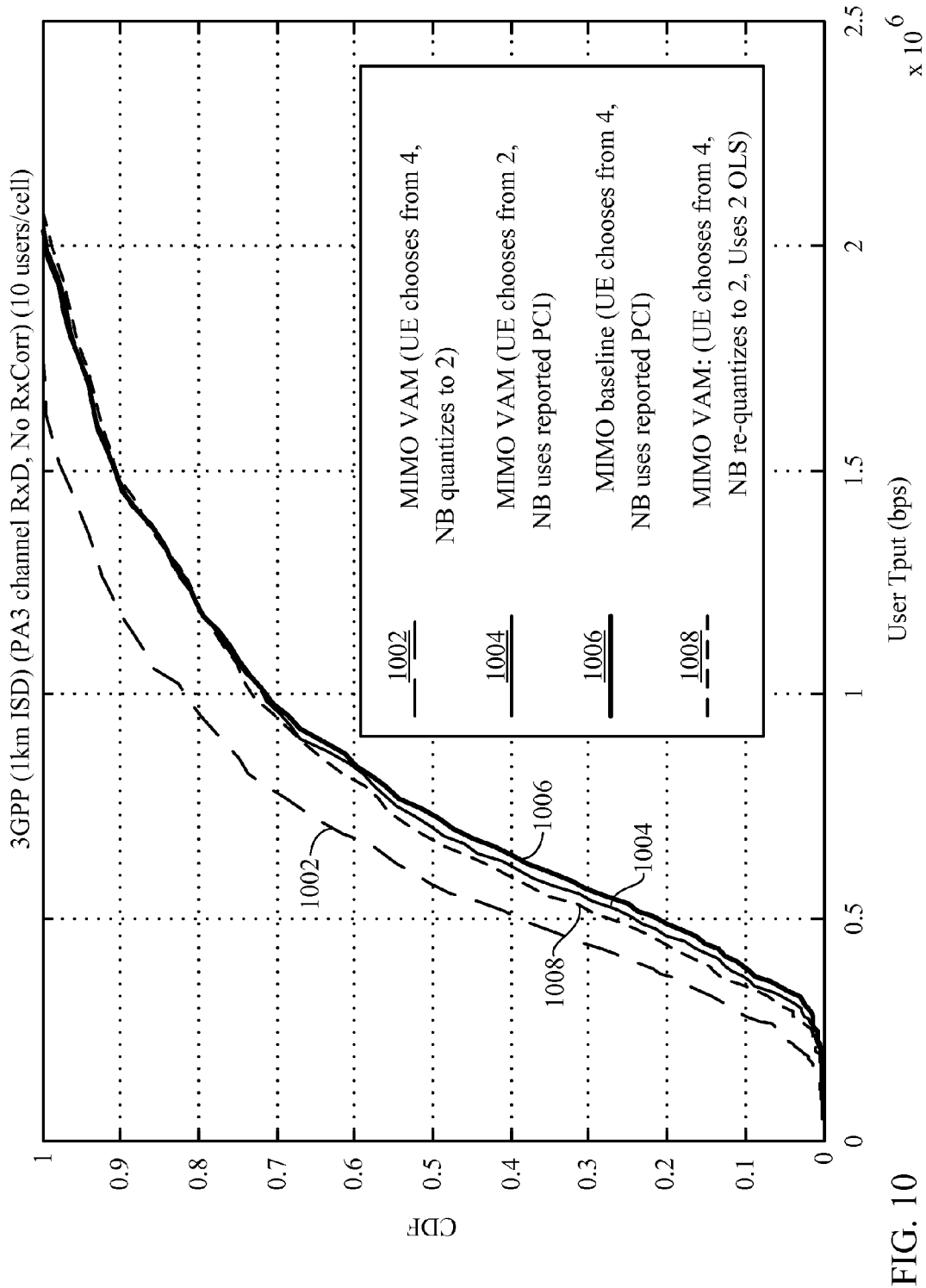
FIG. 10 is a graph of user throughput versus the cumulative density function (CDF) for ten users per cell.
Figure 11:
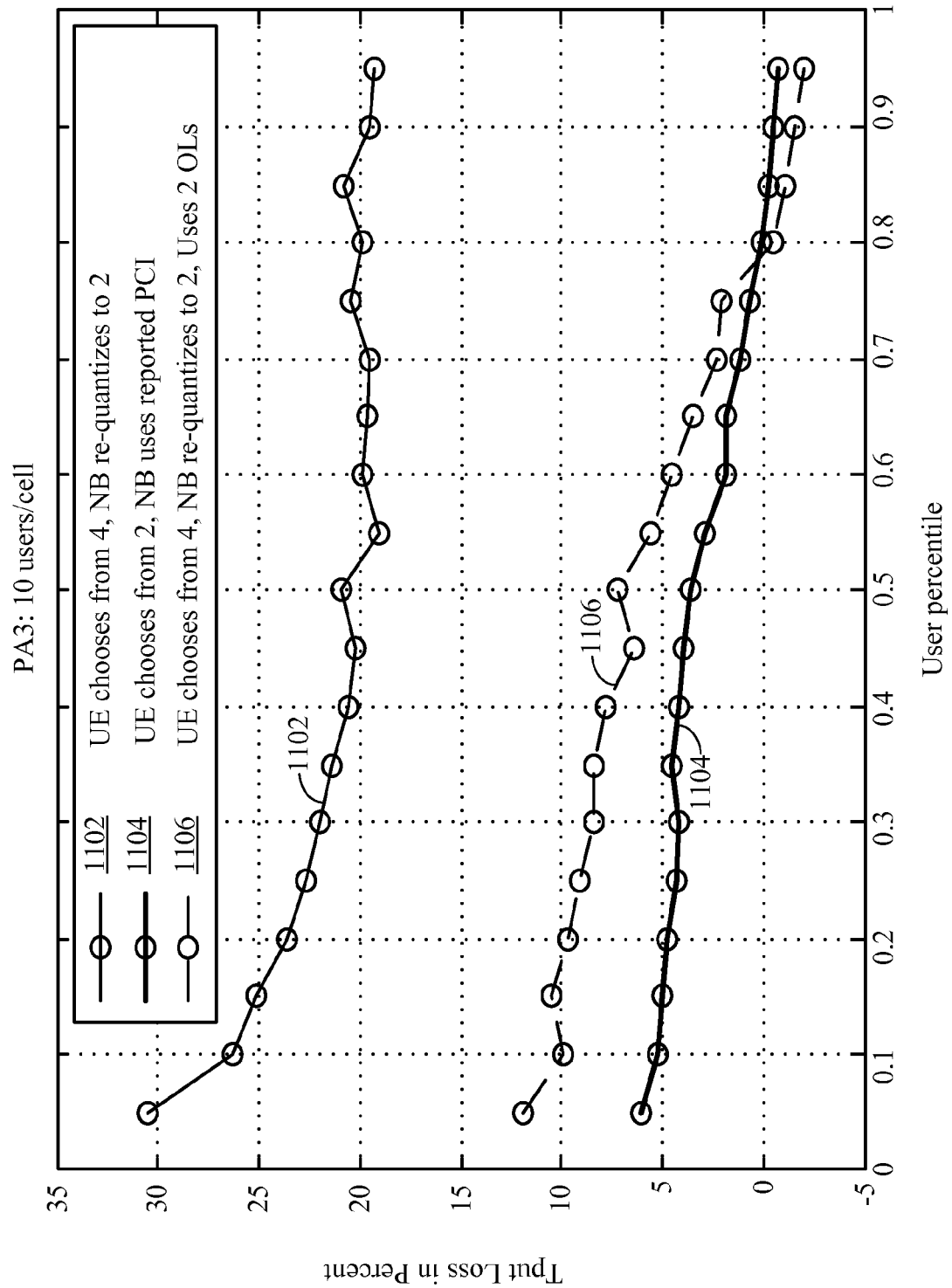
FIG. 11 is a graph of user percentile versus throughput loss in percent for ten users per cell.

FIG. 10 is a graph of user throughput versus the CDF for ten users per cell. FIG. 11 is a graph of user percentile versus throughput loss in percent for ten users per cell. As shown in FIG. 10 and FIG. 11, assuming 10 users per cell, there is a throughput improvement using two OL margins (lines 1008, 1106) as opposed to one OL margin that does not vary depending on whether the reported PCI is in the restricted set or the prohibited set (1002, 1102). Explicit signaling of the codebook restriction while using the work-around is shown by lines 1004, 1104.

Figure 12:
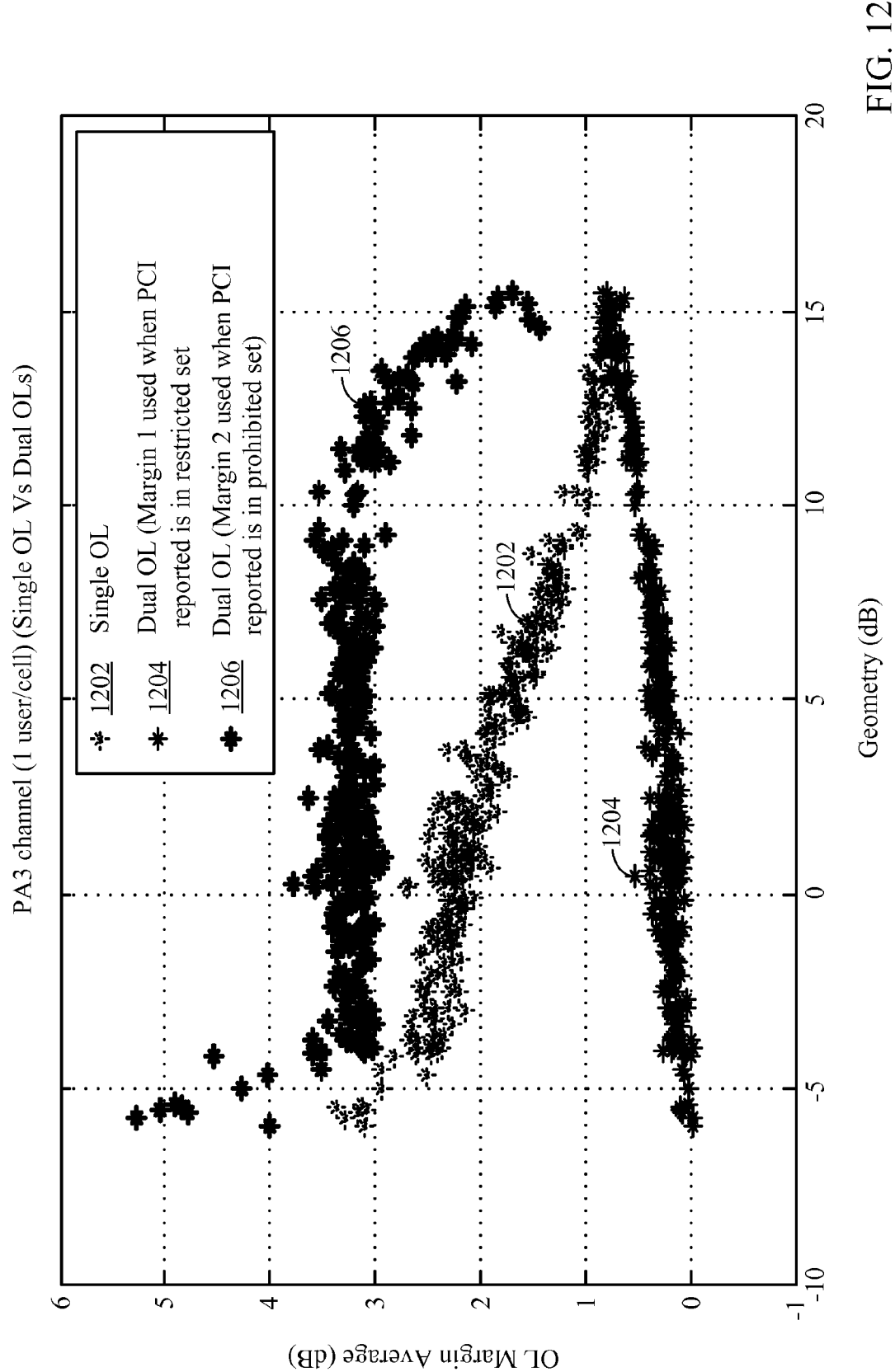
FIG. 12 is a graph of the geometry versus the outer loop (OL) margin average for one user per cell.
Figure 13:
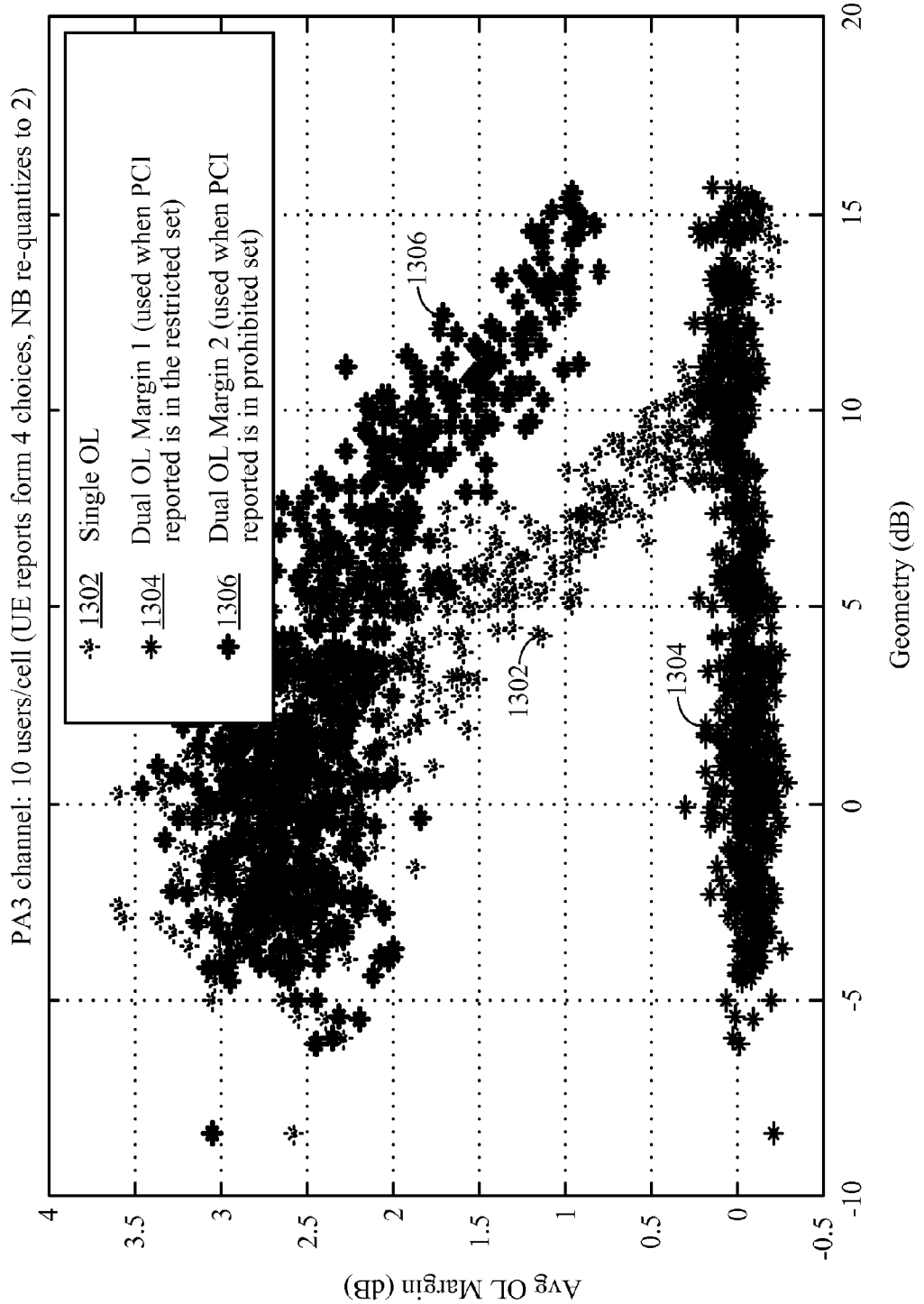
FIG. 13 is a graph of the geometry versus the OL margin average for ten users per cell.

FIG. 12 is a graph of the geometry versus the OL margin average for one user per cell. FIG. 13 is a graph of the geometry versus the OL margin average for ten users per cell. The geometry is the ratio of the power of the cell to the power of interfering cells in dBs. A single OL margin that does not vary depending on whether the reported PCI is in the restricted set or the prohibited set are shown by 1202, 1302. A dual OL margin when the reported PCI is in the restricted set are shown in 1204, 1304. A dual OL margin when the reported PCI is in prohibited set are shown in 1206, 1306.

Figure 14:
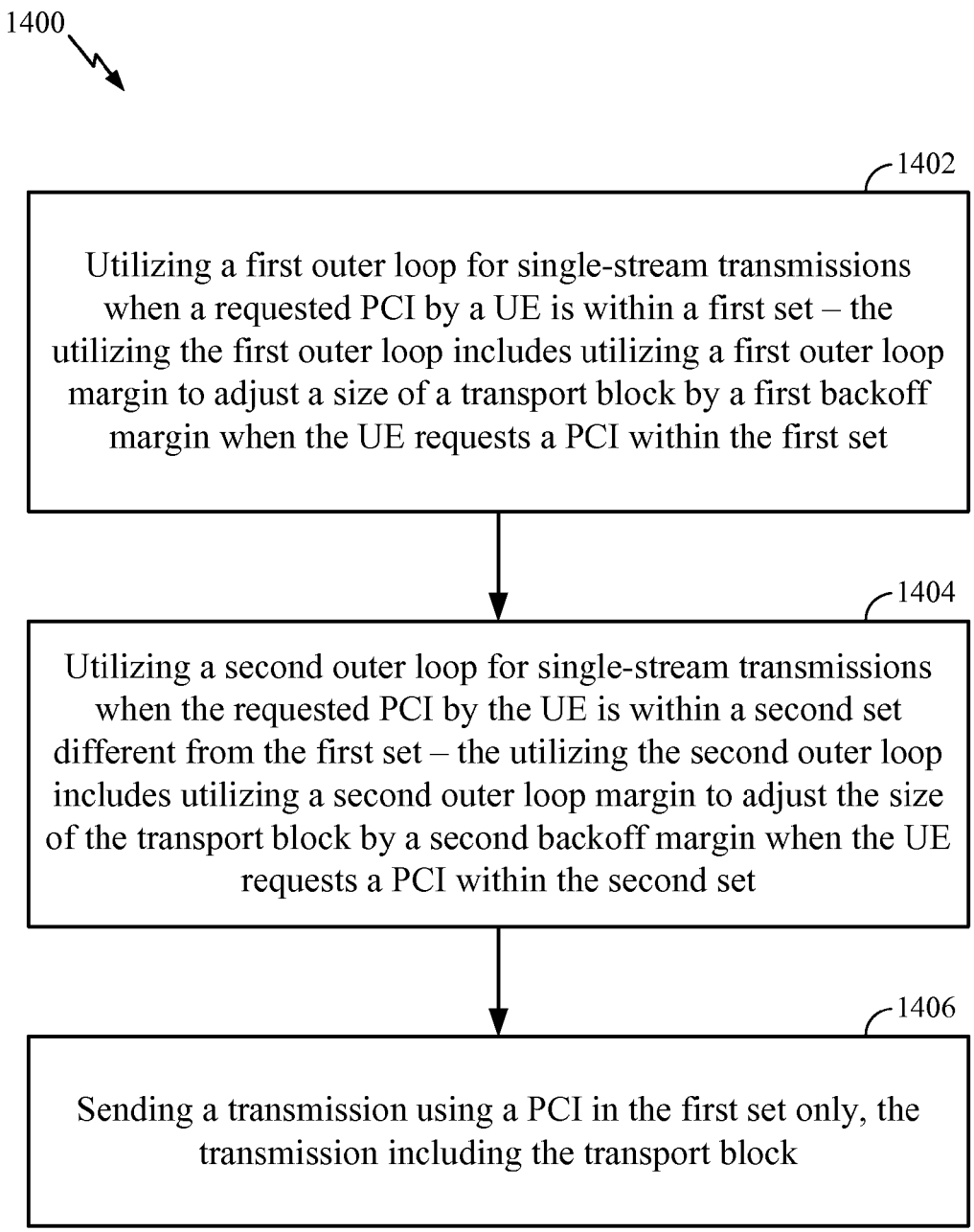
FIG. 14 is a flow chart of an exemplary method.

FIG. 14 is a flow chart 1400 of an exemplary method of a UE. The method of wireless communication includes utilizing a first OL for single-stream transmissions when a requested PCI by a UE is within a first set (1402). The utilizing the first OL includes utilizing a first OL margin to adjust a size of a transport block by a first backoff margin when the UE requests a PCI within the first set (1402). The method further includes utilizing a second OL for single-stream transmissions when the requested PCI by the UE is within a second set different from the first set (1404). The utilizing the second OL includes utilizing a second OL margin to adjust the size of the transport block by a second backoff margin when the UE requests a PCI within the second set (1404).

In one configuration, the method further includes sending a transmission using a PCI in the first set only (1406). The transmission includes the transport block (1406). In one configuration, the first set is a restricted set, the first backoff margin is a restricted backoff margin, the second set is a prohibited set, and the second backoff margin is a prohibited backoff margin. In one configuration, the first outer loop margin is one of static or dynamic and the second outer loop margin is one of static or dynamic. In one configuration, the first set includes a precoding weight $w_2$ of $e^{j\pi/4}$ and $e^{j5\pi/4}$. In one configuration, the second set includes a precoding weight $w_2$ of $e^{j7\pi/4}$ and $e^{j3\pi/4}$. In one configuration, the first outer loop is further utilized for dual-stream transmissions. In one configuration, the first outer loop margin and the second outer loop margin are different. In one configuration, the method is performed by a Node B in an HSDPA system.

Figure 15:
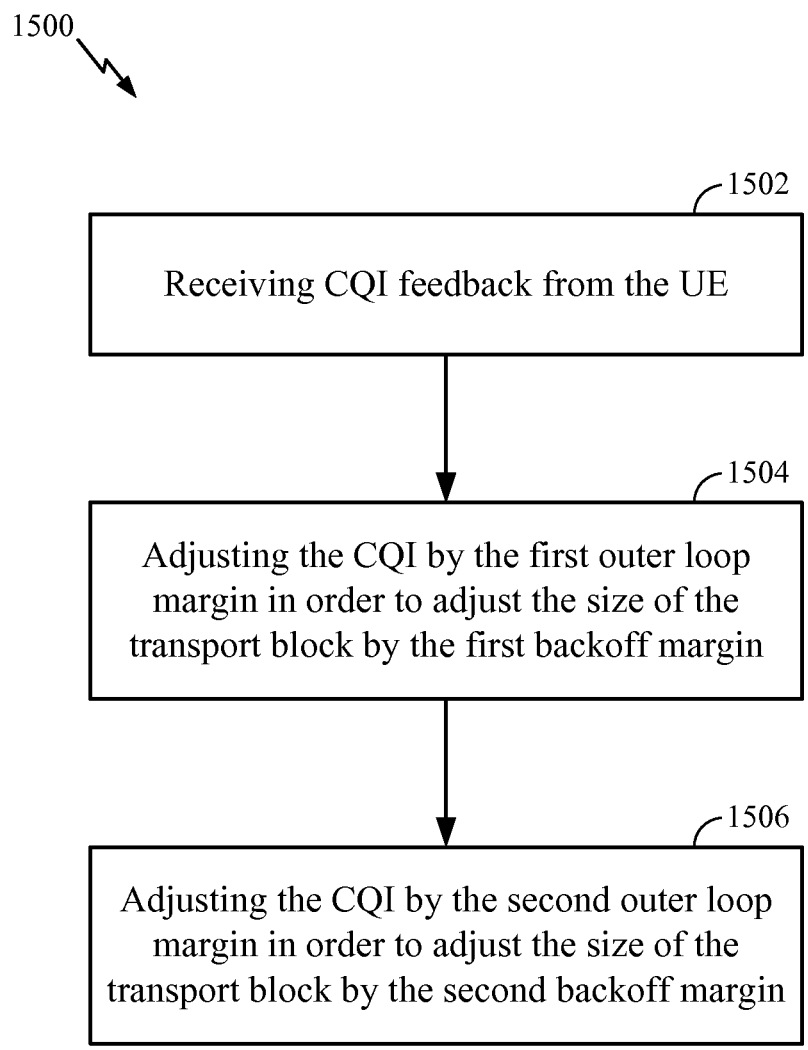
FIG. 15 is another flow chart of an exemplary method.

FIG. 15 is another flow chart 1500 of an exemplary method of a UE. The method includes receiving channel quality indicator (CQI) feedback from the UE (1502). In addition, the utilizing the first OL margin (1402) includes adjusting the CQI by the first OL margin in order to adjust the size of the transport block by the first backoff margin (1504). Furthermore, the utilizing the second OL margin (1404) includes adjusting the CQI by the second OL margin in order to adjust the size of the transport block by the second backoff margin (1506).

Figure 16:
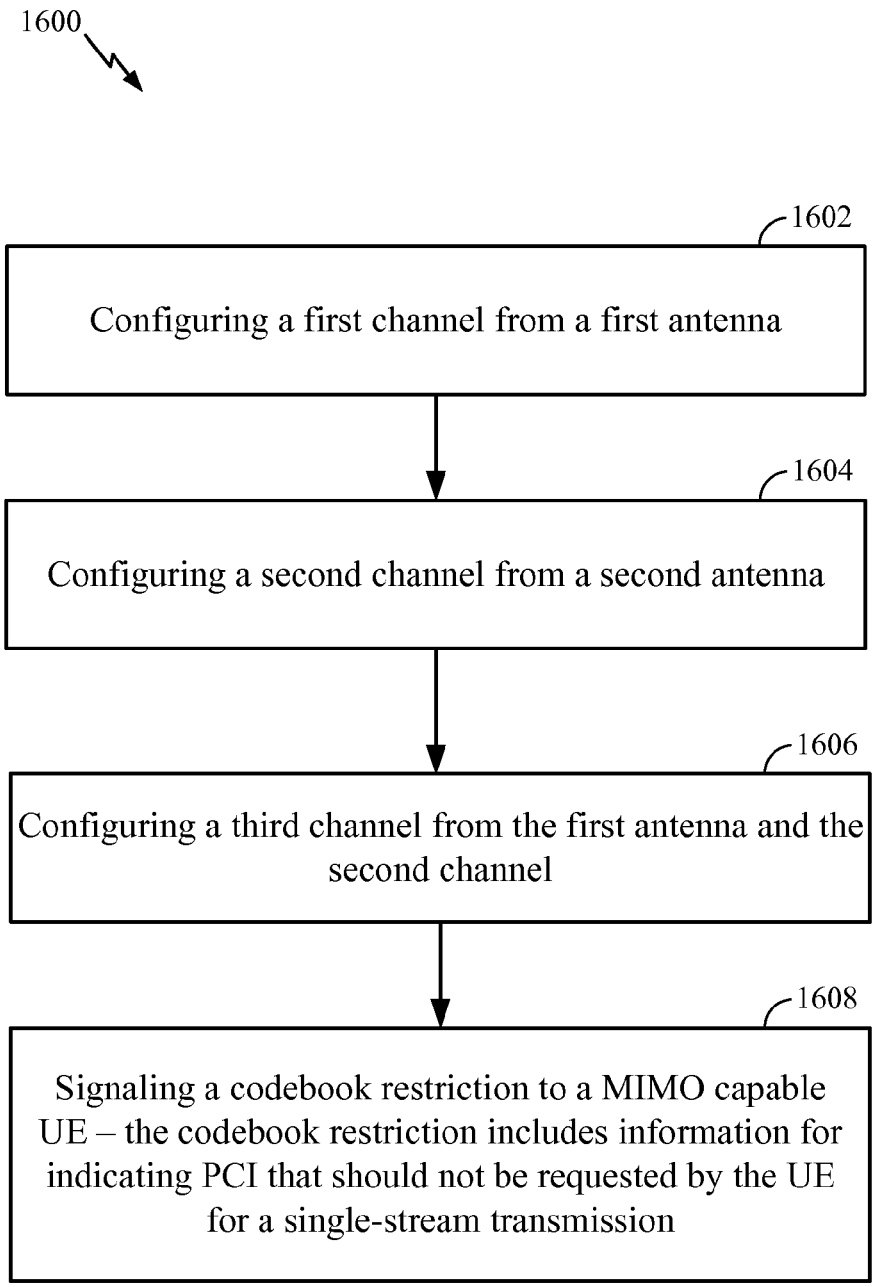
FIG. 16 is a flow chart of another exemplary method.

FIG. 16 is a flow chart 1600 of another exemplary method of an apparatus, which may include a network/RNC 502 and may further include a Node B 510. A method of wireless communication includes configuring a first channel from a first antenna (1602) (see virtual antenna 503A), configuring a second channel from a second antenna (1604) (see virtual antenna 503B), configuring a third channel from the first antenna and the second antenna (1606), and signaling a codebook restriction to a MIMO capable UE (1608). The codebook restriction includes information for indicating PCI that should not be requested by the UE for a single-stream transmission (1608). In one configuration, the first channel is a primary common pilot channel (P-CPICH), the second channel is a secondary common pilot channel (S-CPICH), and the third channel is the HS-PDSCH. In one configuration, the codebook restriction is signaled by a Node B through an HS-SCCH order. In one configuration, the method further includes receiving a message announcing a capability by the UE of receiving the codebook restriction through an RRC message. In one configuration, the codebook restriction is signaled by an RNC through an RRC message. In such a configuration, the method may further include the RNC notifying the Node B of the codebook restriction signaled to the UE.

Figure 17:
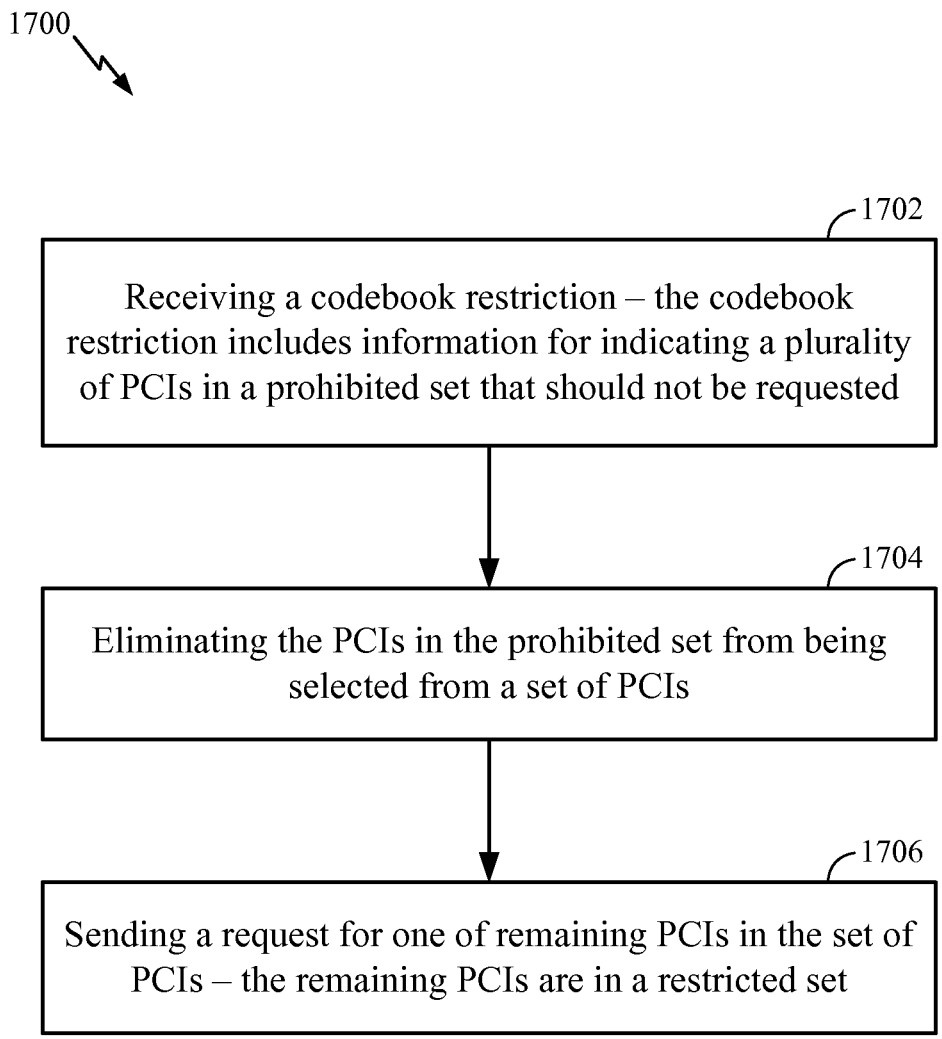
FIG. 17 is a flow chart of yet another exemplary method.

FIG. 17 is a flow chart 1700 of yet another exemplary method of a UE. The method includes receiving a codebook restriction (1702). The codebook restriction includes information for indicating a plurality of PCIs in a prohibited set that should not be requested (1702). The method further includes eliminating the PCIs in the prohibited set from being selected from a set of PCIs (1704). The method further includes sending a request for one of remaining PCIs in the set of PCIs (1706). The remaining PCIs are in a restricted set (1706). In one configuration, the codebook restriction is only applicable when the request is for a single-stream transmission. In one configuration, the codebook restriction is received from a Node B through an HS-SCCH order. In one configuration, the codebook restriction is received from an RNC through an RRC message. In one configuration, the method further includes announcing a capability of receiving the codebook restriction through an RRC message. In one configuration, the method is performed by a MIMO capable UE in an HSDPA system.

Figure 18:
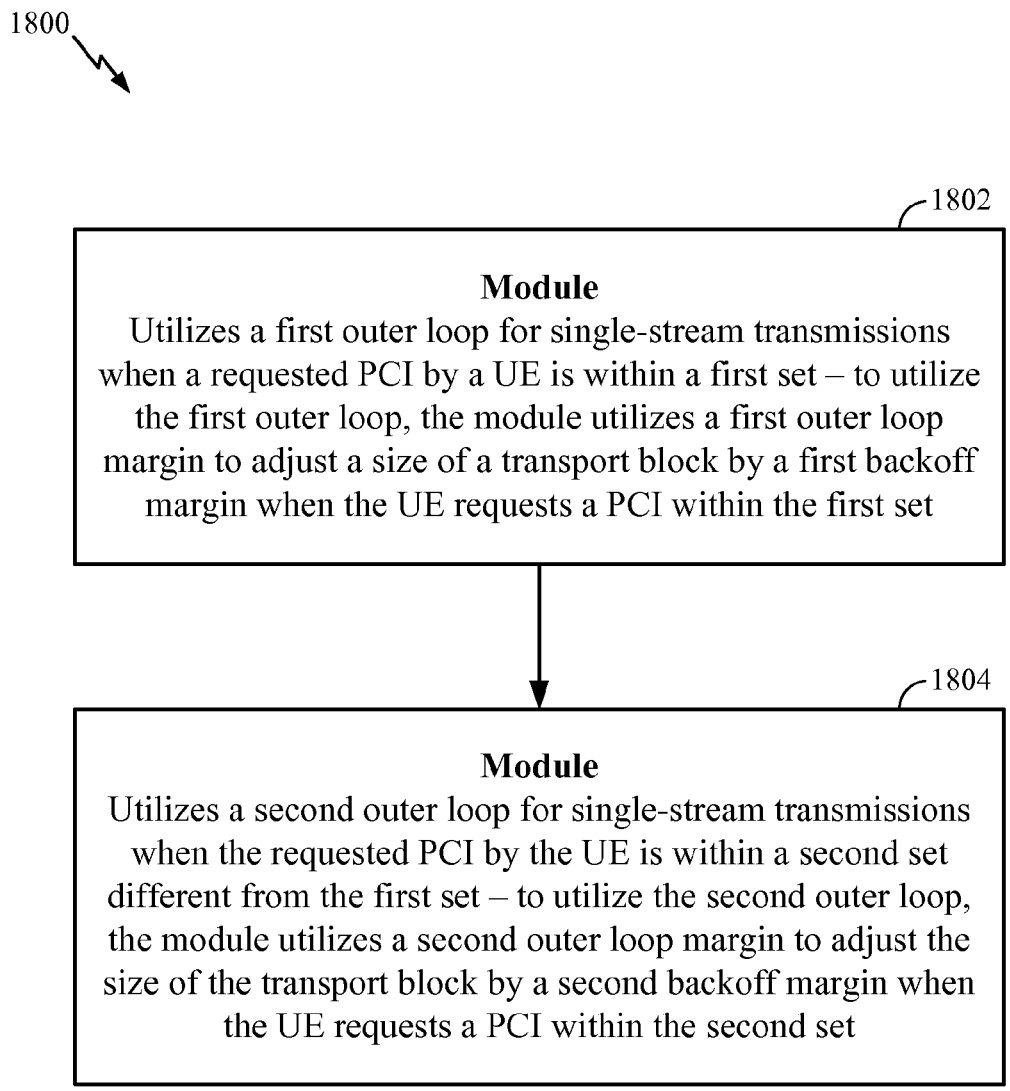
FIG. 18 is a block diagram illustrating the functionality of a first exemplary apparatus.

FIG. 18 is a block diagram 1800 illustrating the functionality of an exemplary UE apparatus 100. The apparatus 100 includes a module 1802 that utilizes a first OL for single-stream transmissions when a requested PCI by a UE is within a first set. To utilize the first OL, the module 1802 utilizes a first OL margin to adjust a size of a transport block by a first backoff margin when the UE requests a PCI within the first set. The apparatus 100 further includes a module 1804 that utilizes a second OL for single-stream transmissions when the requested PCI by the UE is within a second set different from the first set. To utilize the second OL, the module 1804 utilizes a second OL margin to adjust the size of the transport block by a second backoff margin when the UE requests a PCI within the second set.

Figure 19:
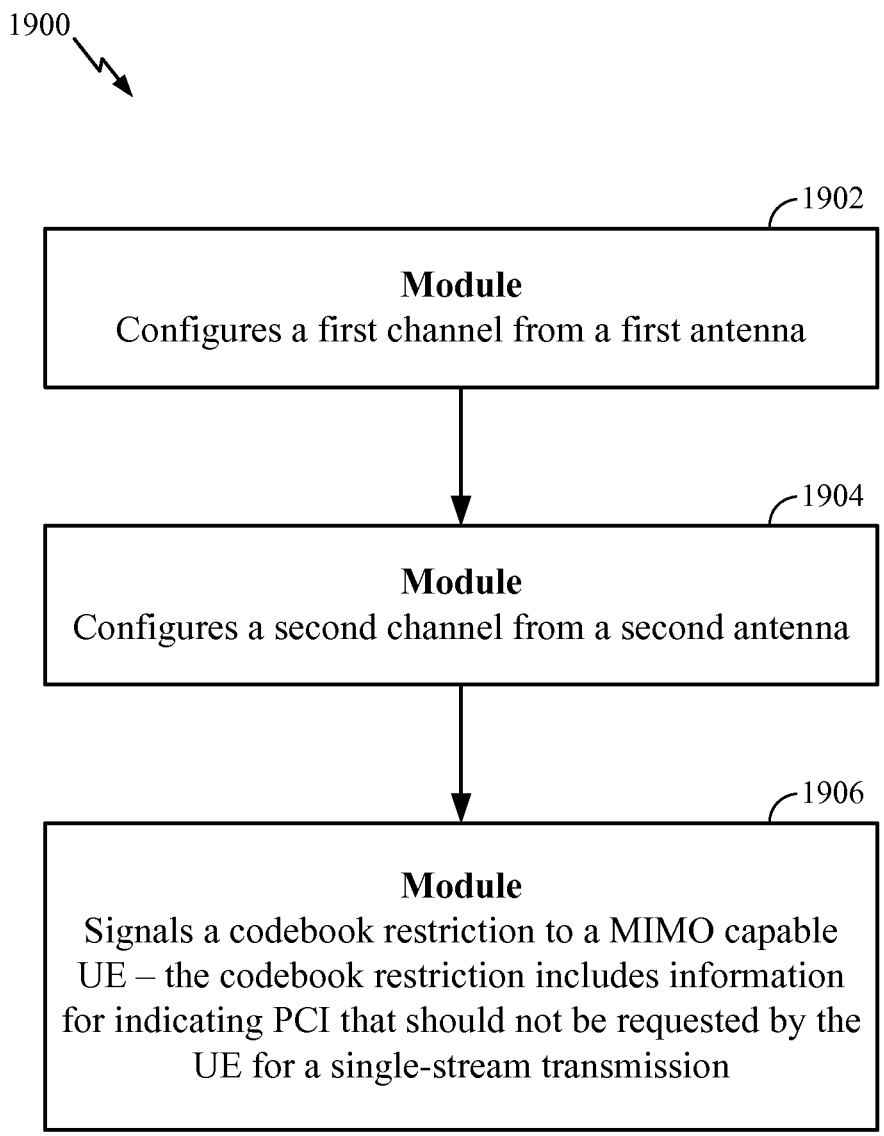
FIG. 19 is a block diagram illustrating the functionality of a second exemplary apparatus.

FIG. 19 is a block diagram 1900 illustrating the functionality of an exemplary apparatus, which may include a network/RNC 502 and may further include a Node B 510. The apparatus includes a module 1902 that configures a first channel from a first antenna, a module 1904 that configures a second channel from a second antenna, and a module 1906 that signals a codebook restriction to a MIMO capable UE. The codebook restriction includes information for indicating PCI that should not be requested by the UE for a single-stream transmission.

Figure 20:
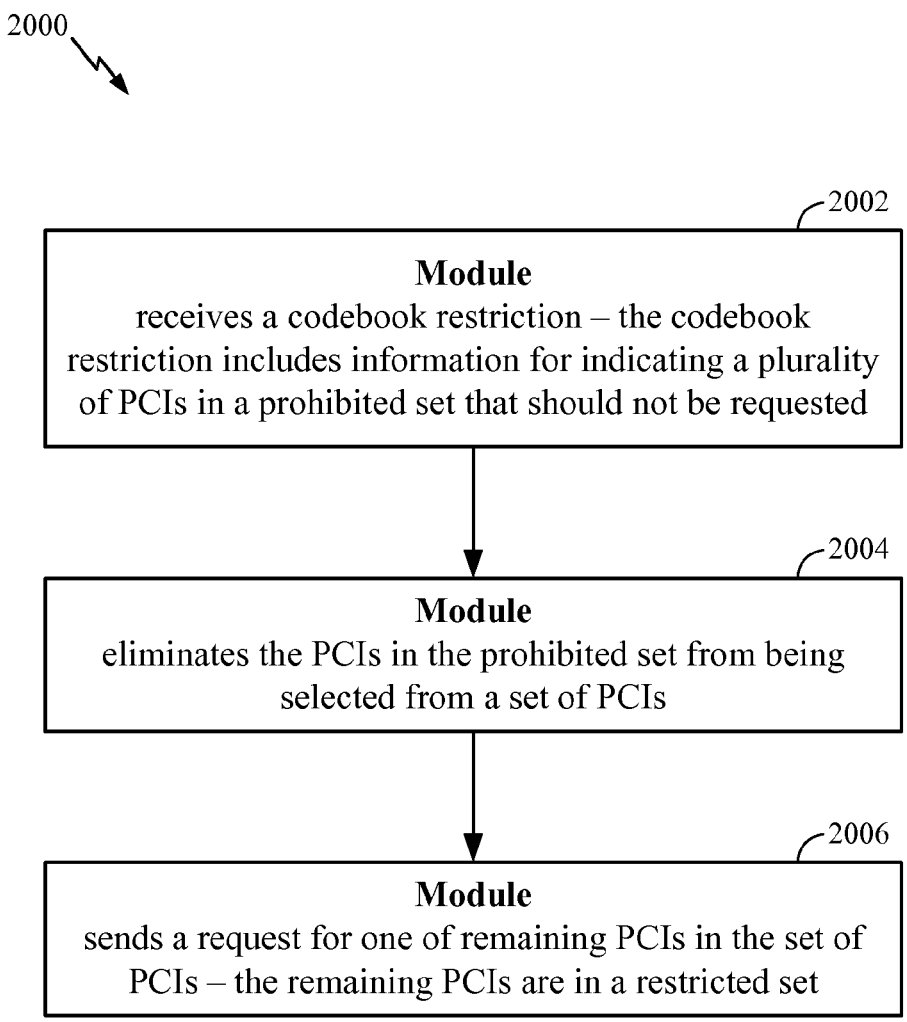
FIG. 20 is a block diagram illustrating the functionality of a third exemplary apparatus.

FIG. 20 is a block diagram 2000 illustrating the functionality of an exemplary UE apparatus 100. The apparatus 100 includes a module 2002 that receives a codebook restriction. The codebook restriction includes information for indicating a plurality of PCIs in a prohibited set that should not be requested. The apparatus 100 further includes a module 2004 that eliminates the PCIs in the prohibited set from being selected from a set of PCIs. The apparatus 100 further includes a module 2006 that sends a request for one of remaining PCIs in the set of PCIs, the remaining PCIs being in a restricted set.

In one configuration, the apparatus 100 for wireless communication includes means for utilizing a first OL for single-stream transmissions when a requested PCI by a UE is within a first set and means for utilizing a second OL for single-stream transmissions when the requested PCI by the UE is within a second set different from the first set. In another configuration, the apparatus 100 includes means for receiving a codebook restriction. The codebook restriction includes information for indicating a plurality of PCIs in a prohibited set that should not be requested. The apparatus 100 further includes means for eliminating the PCIs in the prohibited set from being selected from a set of PCIs and means for sending a request for one of remaining PCIs in the set of PCIs. The remaining PCIs are in a restricted set. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   utilizing a first outer loop for single-stream transmissions when a requested precoding information (PCI) by a user equipment (UE) is within a restricted set, the utilizing the first outer loop comprising utilizing a first outer loop margin to adjust a size of a transport block by a first backoff margin when the UE requests the PCI within the restricted set; and
   utilizing a second outer loop for single-stream transmissions when a PCI by the UE is within a prohibited set different from the restricted set, the utilizing the second outer loop comprising utilizing a second outer loop margin to adjust the size of the transport block by a second backoff margin when the UE requests the PCI within the prohibited set.

2. The method of claim 1, further comprising receiving channel quality indicator (CQI) feedback from the UE, wherein the utilizing the first outer loop margin comprises adjusting the CQI by the first outer loop margin in order to adjust the size of the transport block by the first backoff margin, and wherein the utilizing the second outer loop margin comprises adjusting the CQI by the second outer loop margin in order to adjust the size of the transport block by the second backoff margin.

3. The method of claim 1, further comprising sending a transmission using the PCI in the restricted set only, the transmission including the transport block.

4. The method of claim 1, wherein the first backoff margin is a restricted backoff margin and the second backoff margin is a prohibited backoff margin.

5. The method of claim 1, wherein the first outer loop margin is one of static or dynamic and the second outer loop margin is one of static or dynamic.

6. The method of claim 1, wherein the restricted set comprises a precoding weight $w_2$ of $e^{j\pi/4}$ and $e^{j5\pi/4}$.

7. The method of claim 1, wherein the prohibited set comprises a precoding weight $w_2$ of $e^{j7\pi/4}$ and $e^{j3\pi/4}$.

8. The method of claim 1, wherein the first outer loop is further utilized for dual-stream transmissions.

9. The method of claim 1, wherein the first outer loop margin and the second outer loop margin are different.

10. The method of claim 1, wherein utilizing the first outer loop and utilizing the second outer loop are performed by a Node B in a high-speed downlink packet access (HSDPA) system.

11. An apparatus for wireless communication, comprising:
    means for utilizing a first outer loop for single-stream transmissions when a requested precoding information (PCI) by a user equipment (UE) is within a restricted set, the means for utilizing the first outer loop being configured to utilize a first outer loop margin to adjust a size of a transport block by a first backoff margin when the UE requests the PCI within the restricted set; and
    means for utilizing a second outer loop for single-stream transmissions when a PCI by the UE is within a prohibited set different from the restricted set, the means for utilizing the second outer loop being configured to utilize a second outer loop margin to adjust the size of the transport block by a second backoff margin when the UE requests the PCI within the prohibited set.

12. The apparatus of claim 11, further comprising means for receiving channel quality indicator (CQI) feedback from the UE, wherein the means for utilizing the first outer loop margin adjusts the CQI by the first outer loop margin in order to adjust the size of the transport block by the first backoff margin, and wherein the means for utilizing the second outer loop margin adjusts the CQI by the second outer loop margin in order to adjust the size of the transport block by the second backoff margin.

13. The apparatus of claim 11, further comprising means for sending a transmission using the PCI in the restricted set only, the transmission including the transport block.

14. The apparatus of claim 11, wherein the first backoff margin is a restricted backoff margin and the second backoff margin is a prohibited backoff margin.

15. The apparatus of claim 11, wherein the first outer loop margin is one of static or dynamic and the second outer loop margin is one of static or dynamic.

16. The apparatus of claim 11, wherein the restricted set comprises a precoding weight $w_2$ of $e^{j\pi/4}$ and $e^{j5\pi/4}$.

17. The apparatus of claim 11, wherein the prohibited set comprises a precoding weight $w_2$ of $e^{j7\pi/4}$ and $e^{j3\pi/4}$.

18. The apparatus of claim 11, wherein the first outer loop is further utilized for dual-stream transmissions.

19. The apparatus of claim 11, wherein the first outer loop margin and the second outer loop margin are different.

20. An apparatus for wireless communication, comprising:
    a processor configured to:
        utilize a first outer loop for single-stream transmissions when a requested precoding information (PCI) by a user equipment (UE) is within a restricted set, wherein to utilize the first outer loop, the processor is configured to utilize a first outer loop margin to adjust a size of a transport block by a first backoff margin when the UE requests the PCI within the restricted set; and
        utilize a second outer loop for single-stream transmissions when a PCI by the UE is within a prohibited set different from the restricted set, wherein to utilize the second outer loop, the processor is configured to utilize a second outer loop margin to adjust the size of the transport block by a second backoff margin when the UE requests the PCI within the prohibited set; and
    memory coupled to the processor.

21. The apparatus of claim 20, wherein the processor is further configured to:
    receive channel quality indicator (CQI) feedback from the UE;
    adjust the CQI by the first outer loop margin in order to adjust the size of the transport block by the first backoff margin; and adjust the CQI by the second outer loop margin in order to adjust the size of the transport block by the second backoff margin.

22. The apparatus of claim 20, wherein the processor is further configured to send a transmission using the PCI in the restricted set only, the transmission including the transport block.

23. A non-transitory computer-readable medium storing computer program code comprising instructions executed by a processor to perform a method for wireless communication, the method comprising:
utilizing a first outer loop for single-stream transmissions when a requested precoding information (PCI) by a user equipment (UE) is within a restricted set, wherein the code for utilizing the first outer loop utilizes a first outer loop margin to adjust a size of a transport block by a first backoff margin when the UE requests the PCI within the restricted set; and
utilizing a second outer loop for single-stream transmissions when a PCI by the UE is within a prohibited set different from the restricted set, wherein the code for utilizing the second outer loop utilizes a second outer loop margin to adjust the size of the transport block by a second backoff margin when the UE requests the PCI within the prohibited set.

24. The non-transitory computer-readable medium of claim 23, further comprising code for receiving channel quality indicator (CQI) feedback from the UE, wherein the code for utilizing the first outer loop adjusts the CQI by the first outer loop margin in order to adjust the size of the transport block by the first backoff margin, and wherein the code for utilizing the second outer loop adjusts the CQI by the second outer loop margin in order to adjust the size of the transport block by the second backoff margin.

25. The non-transitory computer-readable medium of claim 23, further comprising code for sending a transmission using the PCI in the restricted set only, the transmission including the transport block.

* * * * *